Patented Oct. 24, 1933

1,931,832

UNITED STATES PATENT OFFICE 1,931,832

PROCESS OF PREPARING ESTERS OF POLYMERIC CARBOHYDRATES

Albrecht Schmidt, Frankfort-on-the-Main, and Gerhard Balle and Hans Lange, Frankfort-on-the-Main-Hochst, Germany, assignors to I. G. Farbenindustrie Aktiengesellschaft, Frankfort-on-the-Main, Germany No Drawing. Application November 7, 1930, Serial No. 494,184, and in Germany November 26, 1929

8 Claims. (Cl. 260—101)

The present invention relates to a process of preparing esters of polymeric carbohydrates.

It is already known that esters of cellulose, the derivatives thereof and other carbohydrates may be made by using an aliphatic carboxylic acid as an acylating agent and simultaneously as a diluent. However, since the acid, the ester of which is to be produced, serves simultaneously as a diluent, it has to be used in a very considerable quantity compared with the cellulose derivative which is to be esterified. Thus after the esterification of the cellulose derivative is complete and the ester has been separated large quantities of very dilute acid remains the regeneration of such acid causes considerable costs, thus rendering the process of esterification very expensive.

The object of the present invention is a process according to which it is possible to decrease considerably the quantity of the aliphatic carboxylic acid required for the esterification. The new process is carried out by causing the free acid to act upon the derivative of carbohydrate, for instance esters or ethers of cellulose starch in liquid sulfur dioxide as a solvent or a diluent. When operating the invention it is possible to decrease the quantity of the acid which serves for the acylation to that which is theoretically required for the degree of acetylation desired.

On account of the very low boiling point of the liquid sulfur dioxide it is necessary to carry out the esterification according to the present process at very low temperatures or in a closed vessel. The reaction occurs very quickly and uniformly. If the esterification is carried out at a temperature which lies above the boiling point of the liquid sulfur dioxide so that the esterification has to take place in a closed vessel, the pressure due to the evaporation of liquid sulfur dioxide can be increased by the addition of an inert gas or of compressed air, this causing an increase of the velocity of the reaction. It may also be advisable to use a catalyst at the reaction. As catalysts there may be added the known substances, such as acids, metal salts or metal oxides. The process may also be carried out by adding an oxidizing agent to the sulfur dioxide so as to produce a restricted quantity of sulfuric acid by oxidation of sulfur dioxide.

When the reaction product is to be worked up, the sulfur dioxide can first be distilled and the remaining cellulose or carbohydrate ester then washed until neutral, or the mixture is introduced directly into water or another suitable precipitating agent, the sulfur dioxide being continuously distilled during this operation according to the temperature of the precipitating bath. Finally the ester or ether-ester of cellulose contained in the mixture can be worked up directly into threads or films.

The following examples serve to illustrate our invention, but they are not intended to limit it thereto, the parts being by weight:

1. 220 parts of diethyl cellulose are dissolved in a closed vessel in 600–1000 parts of liquid sulfur dioxide; to this solution 45 parts of formic acid are added in small amounts at a temperature of between 10° C. and 30° C. After the solution has been thoroughly mixed for several hours, the sulfur dioxide is distilled and the residual product is washed with water. There are obtained about 235 parts of ethyl cellulose formate.

2. 700 parts of liquid sulfur dioxide are introduced into 210 parts of cellulose acetate containing about 50 per cent. of acetic acid and a mixture of 60 parts of butyric acid and 5–8 parts of monohydrate sulfuric acid is added at a temperature of 20° C. After 3–4 hours the mixture is introduced into water at 40° C. during which operation the sulfur dioxide is distilled and the cellulose derivative is caused to separate in form of fibers. The mixed ester obtained is a cellulose aceto-butyrate and is soluble is acetone and other solvents. The yield amounts to 245–250 parts.

3. 190 parts of methyl cellulose are caused to swell in 800 parts of sulfur dioxide; 30–80 parts of glacial acetic acid and 3–5 parts of chromic anhydride are added, and the whole is stirred for two hours at 30° C.–50° C. under a pressure increased to 10 atmospheres by the addition of nitrogen. The product is worked up as described in Example 1 or 2. There is obtained a methyl cellulose acetate insoluble in water in a yield of 200–230 parts corresponding with the glacial acetic acid which has been added.

4. 230 parts of hydroxy-propyl starch are stirred together with 1000 parts of sulfur dioxide and 10 parts of zinc chloride and 90 parts of glacial acetic acid are slowly added at a temperature of 40° C. After about 4 hours the finely dispersed mixture is sprayed into water and the starch derivative which has separated is washed until neutral. There is obtained a hydroxypropyl starch acetate in a very good yield; it is insoluble in water, but soluble in the usual organic solvents.

We claim:

1. The process of esterifying a derivative of a polymeric carbohydrate of the group consisting of carbohydrate ethers and esters, by causing an aliphatic carboxylic acid to act upon the carbohydrate derivative to be esterified in the presence of liquid sulfur dioxide.

2. The process of esterifying a derivative of a polymeric carbohydrate of the group consisting of carbohydrate ethers and esters, by causing a mixture of aliphatic carboxylic acids to act upon the carbohydrate derivative to be esterified in the presence of liquid sulfur dioxide.

3. The process of esterifying a derivative of a polymeric carbohydrate of the group consisting of carbohydrate ethers and esters, by causing an aliphatic carboxylic acid to act upon the carbohydrate derivative to be esterified in the presence of liquid sulfur dioxide while adding a catalyst.

4. The process of esterifying a derivative of a polymeric carbohydrate of the group consisting of carbohydrate ethers and esters, by causing an aliphatic carboxylic acid to act upon the carbohydrate derivative to be esterified in the presence of liquid sulfur dioxide while adding sulfuric acid.

5. The process of esterifying a derivative of a polymeric carbohydrate of the group consisting of carbohydrate ethers and esters, by causing an aliphatic carboxylic acid to act upon the carbohydrate derivative to be esterified in the presence of liquid sulfur dioxide, while raising the pressure by the addition of an inert gas.

6. The process of esterifying a derivative of cellulose of the group consisting of cellulose ethers and esters, by causing an aliphatic carboxylic acid to act upon the cellulose derivative to be esterified in the presence of liquid sulfur dioxide.

7. The process of esterifying a derivative of cellulose of the group consisting of cellulose ethers and esters, by causing acetic acid to act upon the cellulose derivative to be esterified in the presence of liquid sulfur dioxide.

8. The process of esterifying a derivative of cellulose of the group consisting of cellulose ethers and esters, by causing butyric acid to act upon the cellulose derivative to be esterified in the presence of liquid sulfur dioxide.

ALBRECHT SCHMIDT.
GERHARD BALLE.
HANS LANGE.